United States Patent [19]

Despres et al.

[11] Patent Number: 4,820,239

[45] Date of Patent: Apr. 11, 1989

[54] TORSIONAL DAMPER DEVICE FOR TORQUE TRANSMISSION SYSTEMS

[75] Inventors: Dominique Despres, Clichy; Jacques Paquin, Villeneuve-la-Garenne, both of France

[73] Assignee: Valeo, Paris, France

[21] Appl. No.: 86,887

[22] Filed: Aug. 19, 1987

[30] Foreign Application Priority Data

Aug. 21, 1986 [FR] France .................. 86 11937

[51] Int. Cl.⁴ .................. F16D 3/12; F16F 15/10
[52] U.S. Cl. .................. 464/68; 74/574; 192/106.2
[58] Field of Search .................. 74/574; 192/106.2; 464/64, 66, 68

[56] References Cited

U.S. PATENT DOCUMENTS

| | | | |
|---|---|---|---|
| 4,351,167 | 9/1982 | Hanke et al. | 464/68 X |
| 4,537,580 | 8/1985 | Loizeau et al. | 464/68 |

FOREIGN PATENT DOCUMENTS

| | | | |
|---|---|---|---|
| 3315484 | 10/1984 | Fed. Rep. of Germany | 464/66 |
| 2571461 | 4/1986 | France . | |
| 2583486 | 12/1986 | France . | |
| 59-200816 | 11/1984 | Japan | 192/106.2 |
| 61-59024 | 3/1986 | Japan | 192/106.2 |
| 2089472 | 6/1982 | United Kingdom . | |

*Primary Examiner*—Daniel P. Stodola
*Attorney, Agent, or Firm*—Charles E. Brown; Charles A. Brown

[57] ABSTRACT

A torsional damper device suitable for use in an inertia flywheel also serving as the reaction plate of a clutch is provided with arrangements to reduce operating noise. The device comprises coaxial first and second parts which rotate relative to each other to a limited degree. There are two substantially parallel annular flanges on the first part and at least one plate on the second part disposed axially between these flanges. Springs are disposed substantially circumferentially between base members on one of the parts. First engagement devices on the base members cooperate with complementary engagement devices on one of the parts. Second engagement devices on the base members cooperate with complementary engagement devices on the other part. The complementary engagement devices on the one part and/or the other part comprise attached separate members made from an elastomer or synthetic material. This arrangement makes it possible to dispense with accurate cutting out of the flanges and plates of the two coaxial parts.

8 Claims, 2 Drawing Sheets

TORSIONAL DAMPER DEVICE FOR TORQUE TRANSMISSION SYSTEMS

BACKGROUND OF THE INVENTION

1. Field of the invention

The invention relates to a torsional damper device for torque transmission systems such as clutches; it is more particularly concerned with improvements to certain elements of two coaxial parts able to rotate relative to each other to a limited degree.

2. Description of the prior art

A torque transmission system such as a friction clutch designed to be inserted between the crankshaft of the motor and the input shaft of the gearbox in an automobile vehicle usually comprises a torsional damper device adapted to absorb variations in this torque to avoid vibration and in particular audible vibration arising at any point along the kinematic system in which said torsional damper device is inserted. A damper device of this kind is often combined with the friction disk of the clutch or with the inertia flywheel driven by the crankshaft of the motor and also serving as a reaction plate for the clutch.

French Pat. No. 2 571 461 describes a torsional damper device of this kind combined with an inertia flywheel. The flywheel comprises two coaxial parts between which are circumferentially disposed helical coil springs. To be more precise, each spring is held between base members pivotally mounted between two flanges (also called guide rings) of a first part, in this instance the driving part, while the same base members are adapted to be loaded circumferentially with the possibility of articulation by annular metal plates fastened to the driven part, variation in the compression of the springs absorbing variations in torque and procuring some degree of filtering of vibrations of all kinds.

This system gives good results, principally because of the pivoted base members which enable the springs to function under optimum conditions by preventing them being subjected to excessive radial deformation inwards or outwards. However, impacts between the base members on the one hand and the flanges and plates on the other hand are somewhat audible. Also, said base members being molded from a plastics material, the parts of the flanges and plates which cooperate with said base members have to be cut out accurately, free of any burrs, to avoid deterioration of the areas of the base member with which they interact. The flanges and plates are therefore relatively costly to manufacture, since they cannot be made simply by cutting out with a hollow punch.

An object of the invention is to reduce operating noise in a torsional damper device of this kind.

Another object of the invention is to make it possible to manufacture the flanges and plates of this torsional damper device at reduced cost.

SUMMARY OF THE INVENTION

The invention consists in a torsional damper device comprising coaxial first and second parts adapted to rotate relative to each other to a limited degree, two substantially parallel annular flanges on said first part, at least one plate on said second part disposed axially between said flanges, base members on one of said parts, springs disposed substantially circumferentially between said base members, first engagement means on said base members, complementary engagement means on one of said parts adapted to cooperate with said first engagement means, second engagement means on said base members, and complementary engagement means on the other of said parts adapted to cooperate with said second engagement means, wherein said complementary engagement means on said one part and/or said other part comprise attached separate members in an elastomer or synthetic material.

Operating noise is reduced by the fact that the parts which come into contact with the base members are no longer of metal but of a less "noisy" material. Also, the contact surface area between these separate members and the base members can be significantly increased relative to that of the prior art, where the flanges and the plates cooperated with said base members only through their edge. Finally, it becomes a simple matter to obtain high quality pivot surfaces on molding the separate members, as the latter can be fixed without inconvenience to parts of the plates and/or flanges with edges that can be cut without straightening.

The invention will be better understood and its other advantages will emerge more clearly from the following description of a torsional damper device in accordance with the invention, given way of example only and with reference to the appended drawings.

DESCRIPTION OF THE PREFERRED EMBODIMENT

Figure 1:
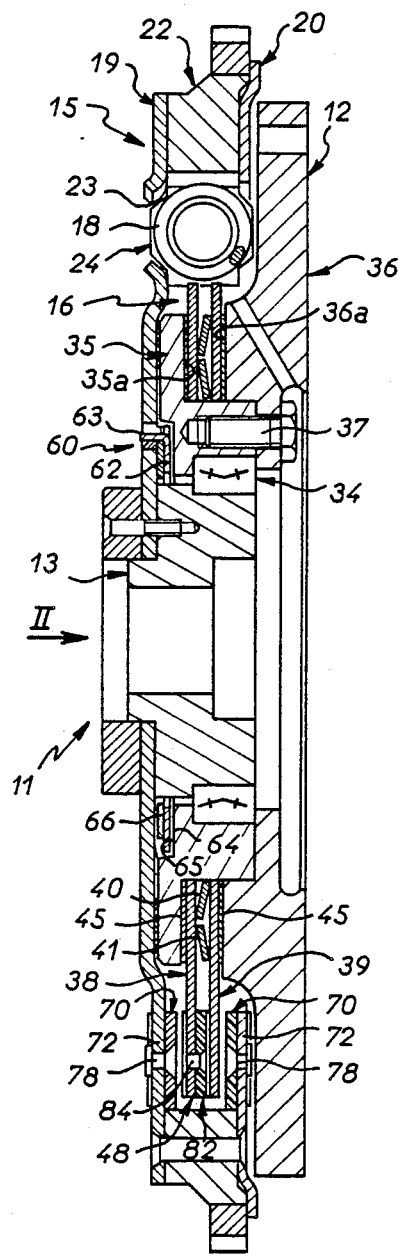
FIG. 1 is a general view of the device in cross-section on the line I—I in FIG. 2.

Referring to the drawings, there is shown an inertia flywheel forming a torsional damper device 11 for an automobile vehicle transmission, the flywheel comprising an annular contact surface 12 so that it can additionally serve as the reaction plate in a friction clutch. To this end, the flywheel 11 is designed to be fixed by its hub 13 to the crankshaft of the internal combustion engine of the automobile vehicle. It comprises two coaxial parts 15 and 16 which will be referred to hereinafter as the first and second parts, respectively, mounted so as to be able to rotate relative to each other to a limited degree against, in particular, the force exerted circumferentially between them by helical coil springs 18. The first or driving part 15, of which the hub 13 forms part, comprises two annular metal flanges 19, 20 usually called "guide rings". The flange 19 is fixed to the hub 13. The flange 20, parallel to the flange 19, is fixed to it at the outside through an interposed massive annular spacer 22 carrying the starter ring. These flanges comprise circumferentially elongate windows 23. Each window in one flange faces a symmetrical window in the other flange in such a way as to define housings adapted to accommodate the springs 18. Each spring 18 is mounted in a housing of this kind through the intermediary of two end base members 24. Each base member 24 comprises first engagement means cooperating with complementary engagement means on the flanges 19 and 20. In the embodiment described each base member comprises in this way two lateral journal members 25 with a common axis parallel to the rotation axis of the damper flywheel whereas the substantially radial edges of the windows 23 are provided with rounded notches 26 receiving the journal members 25 of the corresponding base member. The center of each end of the spring 18 is positioned nearer the rotation axis than the rotation center of the journal member 25.

The second part 16 is mounted to rotate on the hub 13 by means of a ball bearing 34 and comprises an annular member 35 forming a sort of hub and a plate 36 fixed to the annular member 35 by screws 37. This plate constitutes the reaction plate of the clutch since its external radial surface forms the annular contact surface 12 against which the friction clutch (not shown) is placed.

The annular member 35 and the plate 36 comprise respective parallel radial annular bearing surfaces 35a and 36a and two parallel plates 38, 39 stamped out from sheet metal are inserted into the space defined by these two annular bearing surfaces and pushed axially towards them by axially acting spring means, in this instance two Belleville washers 40 and 41. In this instance the bearing surface 35a is formed on a flange on the member 35 extending radially towards the spacer 22 and centering the plates 38, 39. Each plate carries an annular friction facing 45 through which it is in rubbing contact with the corresponding radial annular bearing surface. The plates disposed axially between the two flanges 19, 20 are adapted to cooperate with the base members 24 of the springs (in a way that will be described in more detail below) and the arrangement that has just been described constitutes a torque limiter permitting rotary slipping between said coaxial first and second parts if the torque transmitted exceeds a predetermined value. Each plate 38, 39 comprises a flat annular part carrying the facings 45 extended outwardly by radial arms 48 (equal in number to the springs) constrained to move circumferentially between the springs. Each base member therefore comprises second engagement means in the form of a rounded recess 55 between the two journal members 25 and cooperating with complementary engagement means of the second part, namely substantially circumferential fingers 49 on the arms 48. These fingers are specific to the invention and will be described in more detail later. The base members are molded from a plastics material but carry elastomer material blocks 56 serving as spring abutment members in the event of excessive torque leading to excessive compression of the springs.

The recess 55 is substantially in the middle of the rear surface of the base member 24 and facets inclined relative to each other are defined to either side of said recess 55.

Heel members are defined between said facets and the journal members 25, the distance between two heel members corresponding to the width of the recess.

As the drawings show, the springs are not operative at the beginning of relative annular displacement between the two coaxial parts, since the radial arms have to achieve a certain angular travel before certain of their fingers engage in the recesses in the corresponding base members. Before said fingers engage in the bottom of said base members friction means 60 provided between said coaxial parts are operative as soon as relative angular displacement between the two coaxial parts begins. These friction means comprise a friction ring 62 and a Belleville washer 66 serving as a spring. The friction ring 62 is prevented from rotating relative to the first part 15 by axial lugs 63 inserted in holes in the flange 19. It carries a friction facing 64 pressed axially against a shoulder 65 on the annular member 35 of the second part 16. The friction ring is urged towards said shoulder by the Belleville washer 66 operative between it and the flange 19.

In accordance with the invention, the complementary engagement means of the flanges and/or of the plate or plates comprise separate members of an elastomer or synthetic material, molded from a relatively rigid plastics material, for example. Thus, in the case of the flanges 19 and 20, there are provided first synthetic material members 70 attached to radial areas 72 of said flanges to define the substantially radial edges of the windows 23. The rounded notches 26 are therefore defined in these first members 70, which simplifies the manufacture of the flanges 19, 20. They are substantially thicker than the flanges to which they are fixed, especially in the vicinity of a rounded notch, so that the total articulation surface between the notches 26 and the journal members 25 of any base member 24 is significantly increased. This produces better operating conditions for the base members. Also, the surface state of the edge of the notches 26, being molded, is excellent. Finally, the thickness of the flanges 19, 20 may be reduced since they no longer contribute to the surface of contact with the base members.

Figure 2:
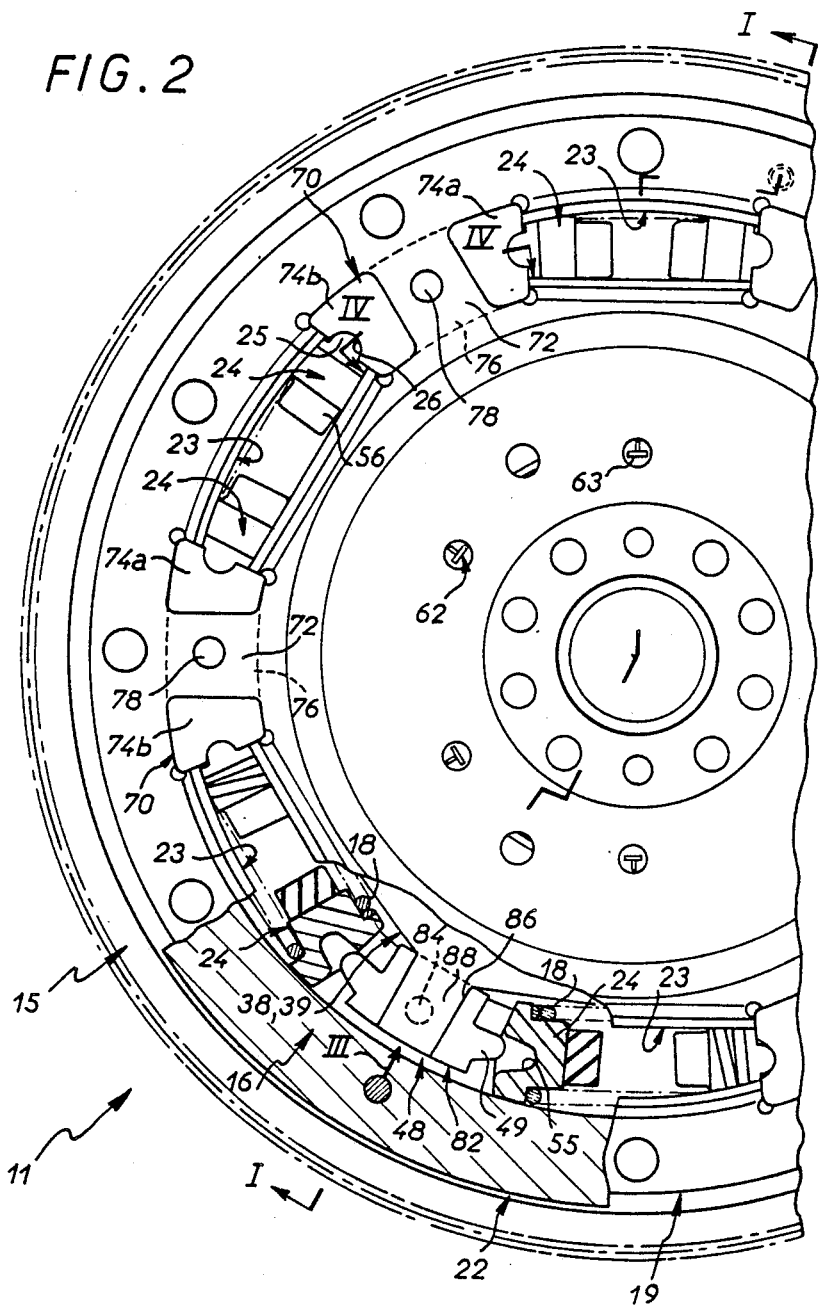
FIG. 2 is a partial and partially cut away view of the same device as seen in the direction of the arrow II in FIG. 1.

As clearly seen in FIG. 2, each of the aforementioned first members 70 is actually common to two adjacent windows 23 of the same flange. It therefore comprises two relatively thick opposed parts 74a, 74b (each provided with a notch 26 respectively corresponding to two adjacent windows 23 of the flange) and a center mounting part 76 comprising in this instance a hollowed out or thinner area the shape and size of which correspond to those of a radial area 72 so as to fit over the latter. The central part 76 is fixed to the radial area 72 by a rivet 78. A step 75 in the thickness of said first member is defined in the vicinity of each rounded notch 26 to permit the passage of the rear surface of the corresponding base member 24. The radial surface of the step 75 is substantially aligned with the inside surface of the flange, for continuity of guidance of the base member when it moves off its supports 25, 26. Thus by shaping appropriately (that is to say according to the shape of the base member) the edges of said first member in the vicinity of the notches 26 it is possible to increase significantly the contact surface area at the end of articulation between each base member and the first member 70, to be more precise between the latter and the aforementioned heel member, which reduces wear of these parts and attenuates noise. The cut-outs defining the windows 23 in the flanges 19, 20 are elongate circumferentially to enable accommodation of the parts 74a, 74b in the thickness of the flange in such a way as to define the circumferential ends of the windows 23. Also, each first part 70 has a median plane of symmetry whereby it is possible to manufacture a single type of member adapted to be mounted on either flange 19 or 20.

Figure 3:
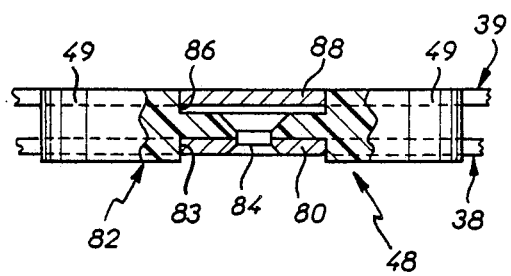
FIG. 3 is a partial and partially cut away view in the direction of the arrow III in FIG. 2 showing in particular the plates of the second part.
Figure 4:
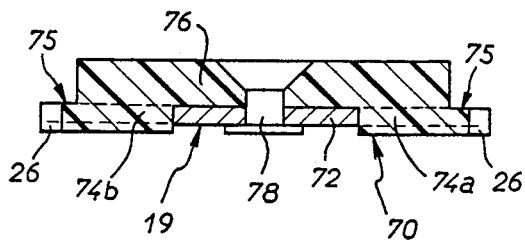
FIG. 4 is a partial cross-section on the line IV—IV in FIG. 2 showing in particular the inventive means associated with a flange of the first part.

With regard to the plates 38 and 39, each of the radial arms 48 mentioned hereinabove comprises a simple radial lug 80 cut into the metal plate proper and, in the case of some radial lugs at least, at least one second elastomer or synthetic material member 82 which is relatively rigid and fixed to said radial lug 80, being shaped to define laterally of this at least one finger 49 the rounded end of which is adapted to enter into pivoting contact with the bottom of a recess 55 of a corresponding base member 24. In this embodiment, each second member 82 comprises two oppositely directed fingers 49 joined to a median part in which is an area of reduced thickness comprising at least one radial groove 83 the size and shape of which correspond to those of a radial lug 80. This first groove thus makes it possible to fit the member 82 onto the corresponding radial lug 80. The member 82 is fixed to said radial lug by a rivet 84 or analogous means. Apart from the fingers 49, the substantially radial edges of each member 82 comprise two portions inclined to each other, to either side of the corresponding finger 49, cooperating with the inclined facets of the corresponding base member. As seen in FIG. 3, here again the contact surface area between each elastomer or synthetic material finger and the bottom of the recess 55 is significantly increased relative to that obtained with the prior art arrangement where contact was made only through the edge of the fingers, cut directly into the metal of the plates. The same applies at the end of articulation between said substantially radial edges and said facets. If the device does not comprise any torque limiting system such as that shown a single plate carrying said second members 82 is sufficient. On the other hand, if the system comprises a torque limiter of this kind requiring two parallel plates, each second member 82 may comprise in its area of reduced thickness a second radial groove 86 oppositely disposed to the groove 82 by which said second member is fixed to one of the flanges. The size and shape of the second groove 86 correspond to another radial lug 88 on the other plate. In the embodiment shown the rivet 84 has two milled heads but it would be equally feasible to provide a normal head at the end with the radial lug 88, a corresponding hole in the latter serving to accommodate the head of the rivet. The radial lug 88 is freely engaged in said second groove 86, by which is meant that it is able to move parallel to the axis of the device. The two plates 38, 39 are thus held in the correct circumferential corresponding relationship, any rotation of one relative to the other being prevented by shaped linkages defined at the level of said second members 82. The plate which is engaged in a second groove 86 can move axially to compensate for wearing down of the facings 45 without being able to escape from this groove. Said second members may all be fixed to one of the plates. Instead, a second member may be fixed to alternate radial lugs on each plate. In this case the two plates as manufactured are strictly identical.

There is claimed:

1. Torsional damper device comprising coaxial first and second parts adapted to rotate relative to each other to a limited degree, two substantially parallel annular flanges on said first part, at least one plate on said second part disposed axially between said flanges, base members on one of said parts, springs disposed substantially circumferentially between said base members, first engagement means on said base members, first complementary engagement means on one of said parts adapted to cooperate with said first engagement means, second engagement means on said base members, and second complementary engagement means on the other of said parts adapted to cooperate with said second engagement means, and at least one of said complementary engagement means being attached separate members being formed selectively from an elastomer material, each flange having circumferentially elongate windows in facing relationship, one of said springs being accommodated in each pair of said facing windows, journal members on each base member, rounded notches in first separate members being disposed on two substantially radial edges of said facing windows in which said journal members pivot, whereby said base members are pivoted between said flanges at the ends of said windows, said at least one plate having radial arms each having two oppositely directed substantially circumferential fingers each having a rounded end, rounded hollows in said base members in which said rounded ends of said fingers pivot, and second separate members attached to said radial arms and shaped to define at least said fingers.

2. Device according to claim 1, wherein the thickness of said rounded notches is greater than the thickness of said flange to which said first separate members incorporating said notches are attached.

3. Device according to claim 1, wherein each first separate member comprises two opposed parts each incorporating two rounded notches corresponding to two respective adjacent windows of the same flange separated by a radial area, and a central mounting part attached to said radial area.

4. Device according to claim 3, wherein each first separate member has a median plane of symmetry.

5. Device according to claim 3, wherein said central part has a reduced thickness portion the shape and size of which correspond to those of said radial areas.

6. Device according to claim 1, wherein each second separate member comprises said two oppositely directed fingers and a central part between said fingers incorporating a reduced thickness area in which there is a radial first groove having a shape and size corresponding to those of a radial lug on said plate, said second separate member being fitted and fixed to said radial lug by said first groove.

7. Device according to claim 6, wherein there are two of said plates arranged in parallel relation, parallel bearing surfaces on said second part and spring means between said plates adapted to urge said plates away from each other towards a respectively one of said bearing surfaces to constitute a torque limiter, and wherein said central part of each second separate member incorporates a second groove opposed to said first groove by which it is fixed to one of said plates, the shape and size of said second groove corresponding to those of a radial lug on the other of said plates, said radial lug being freely inserted in said second groove.

8. Device according to claim 7, together with friction facings between said plates and said bearing surfaces.

* * * * *